US006833709B2

(12) United States Patent
Xie

(10) Patent No.: US 6,833,709 B2
(45) Date of Patent: Dec. 21, 2004

(54) LOW LOSS FUEL CELL CONFIGURATION

(75) Inventor: Chenggang Xie, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/206,014

(22) Filed: Jul. 26, 2002

(65) Prior Publication Data

US 2004/0017198 A1 Jan. 29, 2004

(51) Int. Cl.[7] ............................................. G01N 27/416
(52) U.S. Cl. ........................... 324/434; 324/426; 429/32
(58) Field of Search ................................. 324/416, 426, 324/429, 434; 429/9, 12, 13, 18, 32–34

(56) References Cited

U.S. PATENT DOCUMENTS

| | | | | |
|---|---|---|---|---|
| 4,310,605 A | * | 1/1982 | Early et al. | 429/18 |
| 6,177,736 B1 | * | 1/2001 | Raiser | 307/17 |
| 6,277,511 B1 | * | 8/2001 | Iwase et al. | 429/32 |
| 6,724,194 B1 | * | 4/2004 | Barton | 324/432 |
| 2003/0170520 A1 | * | 9/2003 | Fujii et al. | 429/32 |

FOREIGN PATENT DOCUMENTS

JP     2002358991 A  * 12/2002    ............ H01M/8/04

* cited by examiner

*Primary Examiner*—Minh Chau

(57) ABSTRACT

Switches (306) are used to connect stacks of fuel cells (302, 304) in series or in parallel depending on the load to keep total cell voltage below a maximum input voltage requirement. The cells (302, 304) are coupled in parallel under low power conditions, and the cells are coupled in series under high power conditions to provide a more efficient system (500).

5 Claims, 3 Drawing Sheets

LOW LOSS FUEL CELL CONFIGURATION

FIELD OF THE INVENTION

This invention relates generally to fuel cells and more specifically to the efficiency of fuel cell systems.

BACKGROUND OF THE INVENTION

Fuel cells provide clean, direct current (DC) electricity. Fuel cells convert reactants, namely fuel and oxidant (air or oxygen), to generate electric power and reaction products. A typical fuel cell power source can be constructed from a stack of cells coupled in series as shown in FIG. 1. Fuel cells exhibit a substantially linear decreasing output voltage as the power is increased as represented by FIG. 2 graph 200.

A typical direct methanol fuel cell (DMFC) has an open cell voltage of approximately 0.7 volts, with the cell voltage dropping to approximately 0.25 volts near peak power. The operating voltage for portable devices is typically in the range of 1.5–15 volts. For example, a two-way radio battery may require 10 volts to charge properly. A DC/DC boost converter can be used to provide a 10 V output to such devices. The total cell voltage going to the input of the regulator cannot exceed the output voltage of the regulator. The total number of cells is determined by calculating the regulator output by the open cell voltage (in this example 10V/0.7V would be 14 cells). When the system operates at near peak power, the cell voltage is thus 14×0.25 volts=3.5 volts. It is known that the efficiency of the regulator is dependent on the input voltage to the converter. Generally, closer input voltage to output voltage provides higher efficiency. As an example, some DC/DC converters are rated to have 87% efficiency for converting from 5 volts to 10 volts but only 67% from 2 volts. A fuel cell configuration that increases overall system efficiency is highly desirable. For example, a fuel cell structure that has an open cell voltage of 10 volts that is capable of providing a higher operating voltage near peak power would increase overall efficiency.

Accordingly, it would be highly desirable to have a fuel cell configuration that provides improved efficiency at higher power levels.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale.

DETAILED DESCRIPTION OF THE DRAWINGS

In accordance with the present invention, there is provided herein a fuel cell configuration in which stacks of cells are coupled either in parallel or in series to maintain the total cell voltage below a maximum input for a regulator while providing improved output power at higher output voltage levels.

Figure 1:
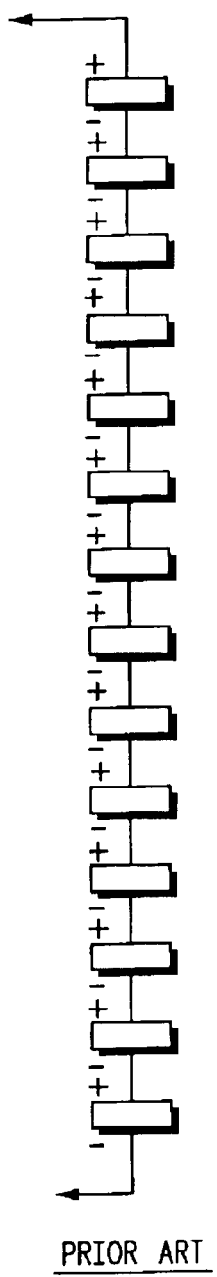
FIG. 1 is a prior art block diagram representation of a stack of fuel cells coupled in series.
Figure 2:
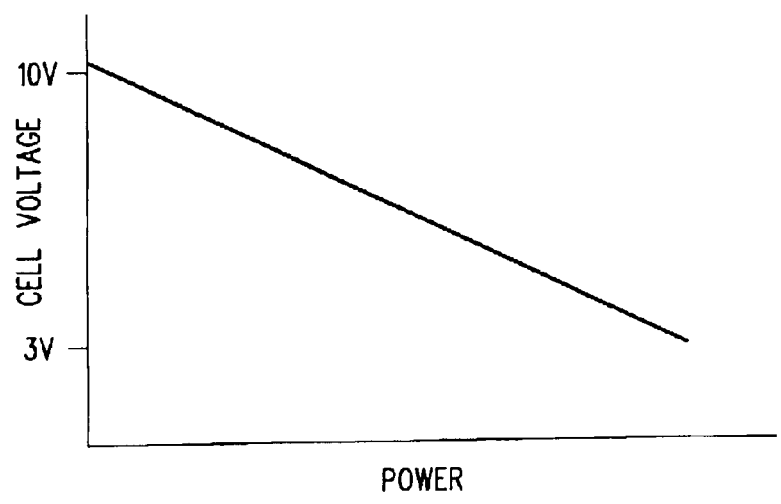
FIG. 2 is a prior art graph of cell voltage versus power for a typical fuel cell.
Figure 3:
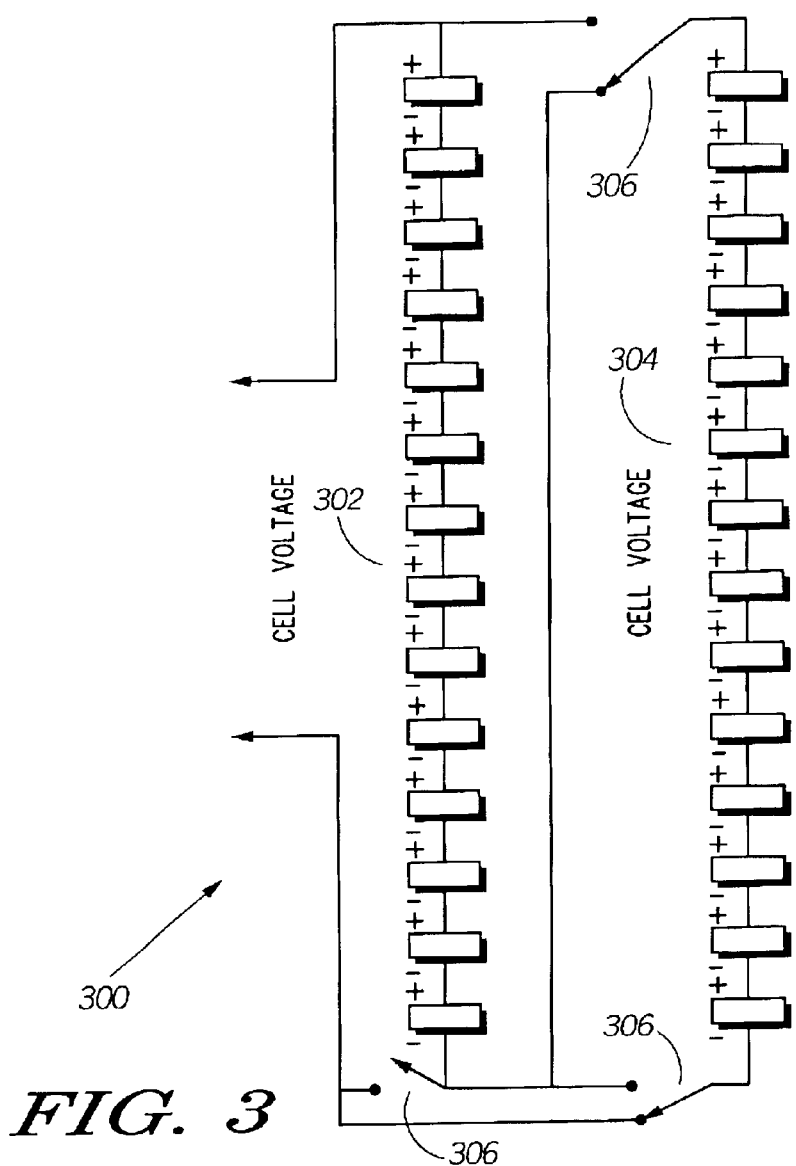
FIG. 3 is a block diagram of a fuel cell structure having improved efficiency in accordance with the present invention.

FIG. 3 shows a fuel cell configuration 300 formed in accordance with the present invention. In accordance with the present invention, fuel cell configuration 300 includes a first stack of fuel cells connected in series 302, a second stack of fuel cells connected in series 304 and a plurality of switches 306 for coupling the second stack of fuel cells in parallel with the first stack of fuel cells under low power conditions and for coupling the first stack of fuel cells in series with the second stack of fuel cells under high power conditions. Fuel cell configuration 300 shows the cells connected in series. In this particular example, each stack is shown having fourteen cells. Greater or fuel cells may be used depending on the application.

Figure 4:
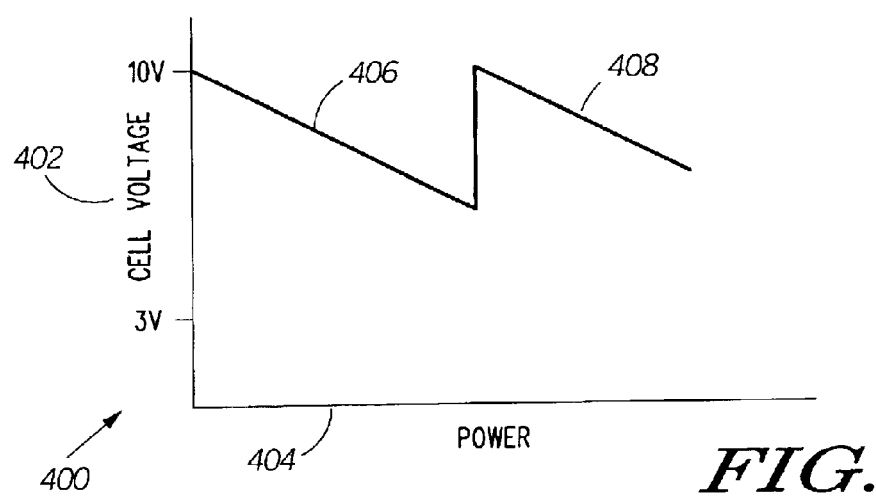
FIG. 4 is an example of a graph depicting cell voltage versus power for the fuel cell structure of FIG. 3 in accordance with the present invention.

FIG. 4 is a graph 400 depicting an example of cell voltage 402 versus power 404 in accordance with the cell configuration of FIG. 3. Designator 406 represents the operating condition in which the two stacks of cells are coupled in parallel and shows how the overall cell voltage falls as the power being drawn is increased. Once the overall cell voltages reaches a predetermined level for a given load, the next operating condition is switched in and the first and second stacks 302, 304 of cells become coupled in series as shown by designator 408. Cell voltage is thus able to increase back up (due to the series connection) while the power drawn continues to increase.

Figure 5:
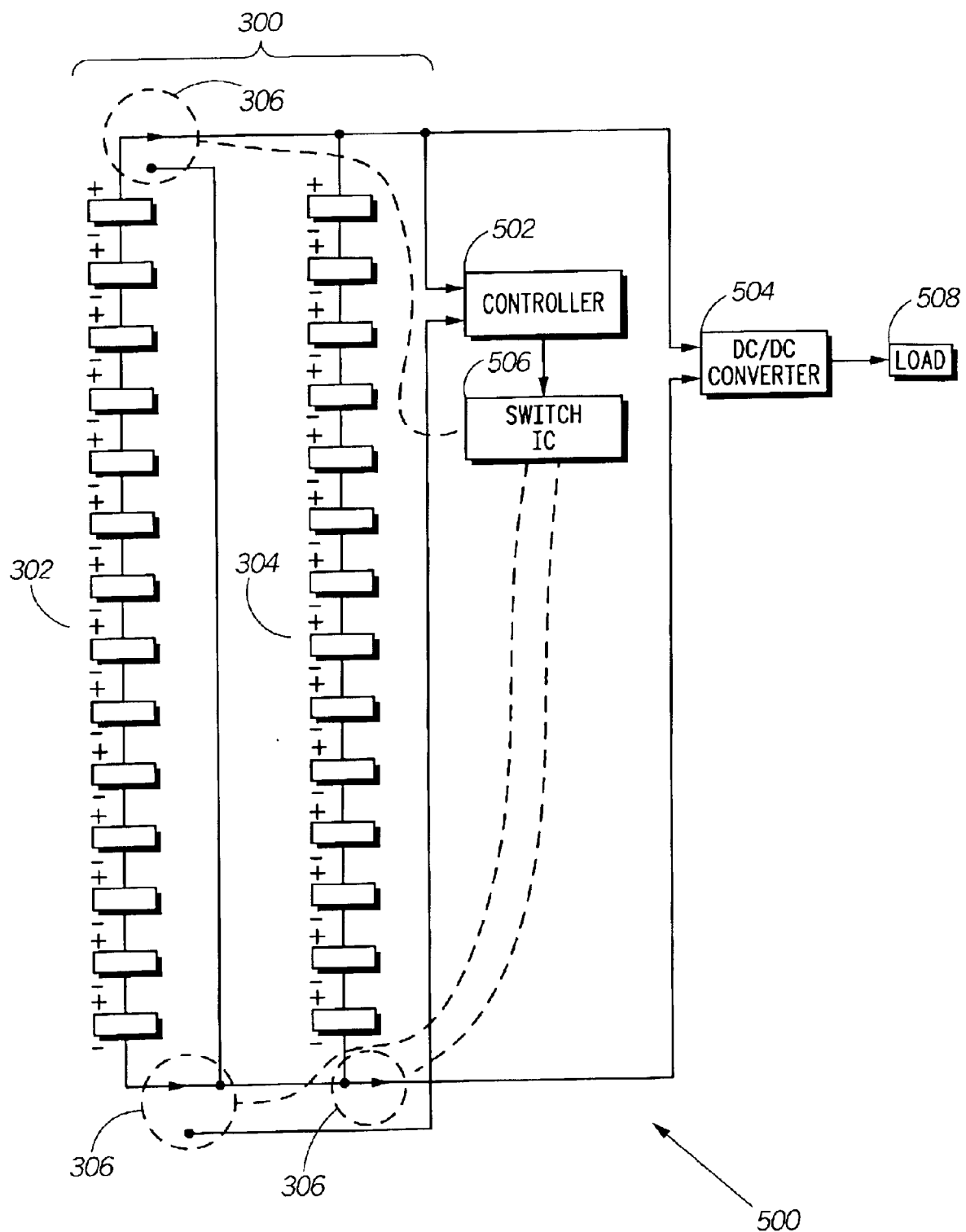
FIG. 5 is a block diagram of a fuel cell system including the improved fuel cell configuration formed in accordance with the present invention.

FIG. 5 is a block diagram of a fuel cell system 500 including the fuel cell configuration formed in accordance with the present invention. First and second fuel cell stacks are operatively coupled to provide for either parallel or series coupling in accordance with the present invention. The configuration in system 500 is a parallel configuration. The system further includes a controller 502, a DC/DC converter 504, a switch 506, and a load 508. The switch 506 is preferably a switching IC under control of controller 502. Switching IC 506 connects the stacks in series or in parallel depending on the load to keep total cell voltage below the maximum input voltage requirement of the DC/DC regulator 504.

Using the 10-volt output as an example, instead of using one stack of fourteen cells, fuel cell configuration 300 provides two stacks of fourteen cells. Within each set or stack, all fourteen cells are connected in series. At low power, the two stacks are connected in parallel. As more power is drawn from the cell, the voltage across the stack drops. When the voltage drops below 5 volts, the switching IC 506 connects the two stacks in series. At near peak power, the cell voltage measures about 7 volts, at which point the efficiency is approximately 10–15% higher than at 3.5 volts.

The number of cells in each stack is determined in accordance with the voltage requirements of the application. Load, input voltage limits, and cell characteristics all play a role in determining what switchover limits to set. Thus, while the examples described have shown with two stacks of fourteen cells, the fuel cell configuration of the present invention could consist of a plurality of stacks with more or fewer cells within each stack.

The following steps summarize a method of deriving improved fuel cell efficiency through a fuel cell configuration formed in accordance with the present invention. Initially, stacks of series-connected fuel cells are provided and switchably coupled in a parallel. The voltage of the parallel-coupled stacks is monitored and compared to a predetermined level. In response to the voltage falling below the predetermined level, the stacks of fuel cells are switched into a series configuration, thus providing a higher voltage and greater efficiency.

Accordingly, there has been provided an improved fuel cell configuration that provides greater efficiency to fuel cell systems. A variety of products including but not limited to communications products, such as two-way radios and cell phones, can benefit from the overall performance improvement with improved talk time performance.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A fuel cell structure, comprising:
   a first array of fuel cells formed in a stacked configuration and connected in series;
   a second array of fuel cells formed in a stacked configuration and connected in series; and
   a switch for coupling the second array of fuel cells formed in a stacked configuration in parallel with the first array of fuel cells formed in a stacked configuration under low power output conditions and for coupling the first array of fuel cells formed in a stacked configuration in series with the second array of fuel cells under high power output conditions.

2. A fuel cell system comprising:
   a first array of fuel cells formed in a stacked configuration and connected in series;
   a second array of fuel cells formed in a stacked configuration and connected in series; and
   a plurality of switches for coupling the first and second arrays of fuel cells in parallel for a first set of predetermined conditions and for connecting the first and second arrays of fuel cells in series for a second set of predetermined conditions;
   wherein the first and second set of predetermined conditions are power output conditions.

3. The fuel cell system of claim 2, wherein each array comprises fourteen fuel cells formed in stacked configuration.

4. A fuel cell system, including:
   an array of fuel cells formed in a stacked configuration, coch array comprising a plurality of fuel cells coupled in series, the array of fuel cells being switchably coupled in parallel under a first set of operating conditions and each array of fuel cells being switchably coupled in series under a second set of operating conditions; wherein the operating conditions are based on a predetermined power output; and
   a load drawing power from the parallel-coupled fuel cells under the first set of conditions and then load drawing power from the series coupled fuel cells under the second set of operating conditions.

5. The fuel cell system of claim 4, wherein a power level is maintained above the predetermined power level by switching from parallel coupling of the array of fuel cells to series coupling of the array of fuel cells.

* * * * *

UNITED STATES PATENT AND TRADEMARK OFFICE
CERTIFICATE OF CORRECTION

PATENT NO. : 6,833,709 B2
DATED : December 21, 2004
INVENTOR(S) : Chenggang Xie

It is certified that error appears in the above-identified patent and that said Letters Patent is hereby corrected as shown below:

<u>Column 4,</u>
Line 25, replace "coch" with -- each --.

Signed and Sealed this

Third Day of January, 2006

JON W. DUDAS
*Director of the United States Patent and Trademark Office*